(12) United States Patent
Wang

(10) Patent No.: US 11,987,384 B2
(45) Date of Patent: May 21, 2024

(54) TIMING APPARATUS

(71) Applicant: AUTEL ROBOTICS CO., LTD., Guangdong (CN)

(72) Inventor: Bingchun Wang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 971 days.

(21) Appl. No.: 16/938,118

(22) Filed: Jul. 24, 2020

(65) Prior Publication Data

US 2020/0354080 A1 Nov. 12, 2020

Related U.S. Application Data

(63) Continuation of application No. PCT/CN2018/109495, filed on Oct. 9, 2018.

(30) Foreign Application Priority Data

Jan. 25, 2018 (CN) .......................... 201820127628.1

(51) Int. Cl.
*H02J 7/00* (2006.01)
*B64C 39/02* (2023.01)
*B64D 47/08* (2006.01)
*G04R 20/02* (2013.01)
*H02J 7/34* (2006.01)
*B64U 10/10* (2023.01)
*B64U 101/00* (2023.01)

(52) U.S. Cl.
CPC ............ *B64D 47/08* (2013.01); *B64C 39/024* (2013.01); *G04R 20/02* (2013.01); *H02J 7/342* (2020.01); *B64U 10/10* (2023.01); *B64U 2101/00* (2023.01)

(58) Field of Classification Search
CPC .. B64C 39/024; B64U 10/10; B64U 2101/00; B64U 50/19; H02J 7/342; B64D 47/08; B64D 2221/00; G04R 20/02; G04G 15/006
USPC ......................................... 320/103, 106, 159
See application file for complete search history.

(56) References Cited

U.S. PATENT DOCUMENTS

2019/0112049 A1* 4/2019 Phan ....................... B64F 1/007

FOREIGN PATENT DOCUMENTS

| CN | 103744372 A | * | 4/2014 |
| CN | 103744372 A | | 4/2014 |
| CN | 105425160 A | | 3/2016 |
| CN | 105981258 A | | 9/2016 |

(Continued)

OTHER PUBLICATIONS

The International Search Report dated Jan. 14, 2019; PCT/CN2018/109495.

*Primary Examiner* — Zixuan Zhou
(74) *Attorney, Agent, or Firm* — Frank Gao, Esq.

(57) ABSTRACT

The present application provides a timing apparatus mounted in an unmanned aerial vehicle (UAV). The timing apparatus includes: a timing unit configured to generate a current reference time and to send the current reference time to at least one system in the UAV; and a power supply unit connected to the timing unit and configured to supply power to the timing unit. According to the timing apparatus provided in the present application, the current reference time is generated through the timing unit in the technical apparatus, and is provided to the system in the UAV, thereby synchronizing a system time of the UAV with the current reference time.

17 Claims, 3 Drawing Sheets

(56) References Cited

FOREIGN PATENT DOCUMENTS

| | | |
|---|---|---|
| CN | 106688136 A | 5/2017 |
| CN | 106716776 A | 5/2017 |
| CN | 107065511 A | 8/2017 |
| CN | 207917168 U | 9/2018 |
| WO | 2015/060487 A1 | 4/2015 |
| WO | 2017/048016 A1 | 3/2017 |

* cited by examiner

TIMING APPARATUS

This application is a continuation application of International Application No. PCT/CN2018/109495, filed on Oct. 9, 2018, which claims priority of Chinese Patent Application No. 201820127628.1, filed on Jan. 25, 2018, which is incorporated herein by reference in its entirely.

BACKGROUND

Technical Field

The present application relates to the technical field of unmanned aerial vehicles (UAV), and in particular, to a timing apparatus.

Related Art

Unmanned aerial vehicles (UAV) usually need to execute tasks with reference to a system time in the UAV. In order to ensure normal operation of the UAV, the system time of the UAV needs to be synchronized with a current reference time.

In order to ensure time synchronization, the current reference time is obtained from outside by the UAV. For example, the UAV determines the current reference time according to an obtained global positioning system (GPS) signal or through a ground control terminal connected to the UAV. However, when the UAV is in a weak signal environment, the current reference time cannot be obtained in the above manner in time, and therefore the system time cannot be synchronized with the current reference time, affecting task execution accuracy of the UAV.

SUMMARY

The present application provides an apparatus to synchronize a system time of an UAV with a current reference time.

Embodiments of the present application provide a timing apparatus mounted in an UAV. The timing apparatus includes:

a timing unit configured to generate a current reference time and to send the current reference time to at least one system in the UAV; and a power supply unit connected to the timing unit and configured to supply power to the timing unit.

It can be learned from the above that, the timing apparatus provided in the embodiments of the present application is disposed in the UAV, and generates the current reference time through the timing unit in the timing apparatus and provides the current reference time to the system in the UAV, so that a system time of the UAV is synchronized with the current reference time, thereby improving task execution accuracy of the UAV.

In an embodiment of the present application, the power supply unit includes a rechargeable battery.

In an embodiment of the present application, the apparatus further includes:

a charging control unit connected to the power supply unit and a power supply system of the UAV respectively and configured to control the power supply system of the UAV to charge the rechargeable battery.

In an embodiment of the present application, the charging control unit is further configured to: determine whether a remaining battery level of the rechargeable battery is sufficient, and if it is determined that the remaining battery level of the rechargeable battery is insufficient, control the power supply system of the UAV to charge the rechargeable battery.

In an embodiment of the present application, the charging control unit is further configured to control, according to a remaining battery level of the rechargeable battery and an available battery level of the power supply system of the UAV, the power supply system of the UAV to charge the rechargeable battery or not.

In an embodiment of the present application, the apparatus further includes:

a communication unit configured to communicate with an external device to obtain an external reference time recorded by the external device, and to send the external reference time to the timing unit.

The timing unit is further configured to receive a current reference time sent by the communication unit, and to update the generated current reference time to the external reference time.

In an embodiment of the present application, the apparatus further includes:

a calibration unit configured to: receive the external reference time sent by the communication unit, determine, according to the external reference time, whether the current reference time generated by the timing unit needs to be calibrated, and if a determining result is yes, send the external reference time to the timing unit.

In an embodiment of the present application, the timing unit includes a communication interface.

The communication interface is configured to be connected to the at least one system.

In an embodiment of the present application, the communication interface includes any of a UART serial port, a single-wire interface and a bus interface.

In an embodiment of the present application, the timing unit is a low-power-consumption timing chip.

The embodiments of the present application further provide a UAV, including:

the timing apparatus according to any of the above embodiments.

It can be learned from the above that, according to the UAV provided in the embodiments of the present application, the current reference time is generated through the timing unit disposed in the timing apparatus and is provided to the system in the UAV, so that a system time of the UAV is synchronized with the current reference time.

The timing apparatus provided in the embodiments of the present application is mounted in the UAV, and may include a timing unit and a power supply unit. The timing unit is configured to generate the current reference time and to send the current reference time to the at least one system in the UAV. The power supply unit is configured to supply power to the timing unit to ensure normal operation of the timing unit. It can be learned from the above that, the timing apparatus provided in the embodiments of the present application can independently provide the current reference time to the UAV, so that the system time of the UAV is synchronized with the current reference time, thereby improving the task execution accuracy of the UAV.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following

DETAILED DESCRIPTION

Figure 1:
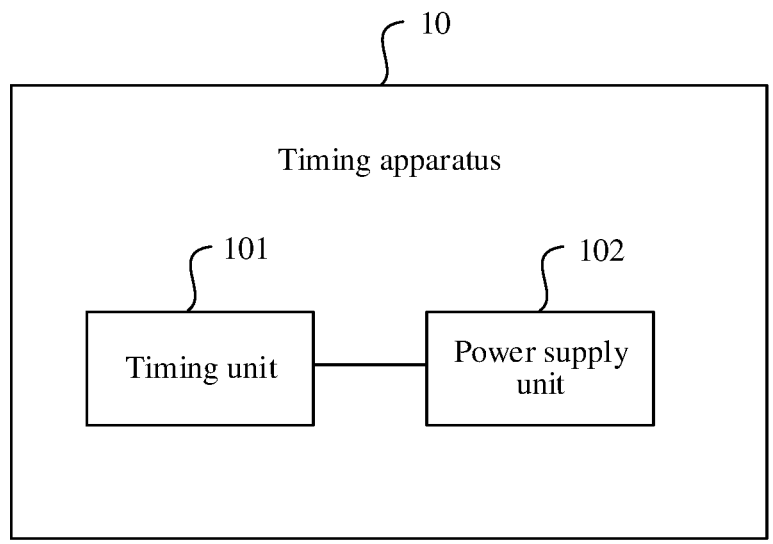
FIG. 1 is a schematic structural diagram of a timing apparatus according to an embodiment of the present application.

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations described herein are merely examples of the apparatus and method that are described in claims in detail and that are consistent with some aspects of the present disclosure.

In the specification, claims, and accompanying drawings of this application, the terms "first", "second", "third", "fourth", and so on (if existing) are intended to distinguish between similar objects but do not necessarily indicate a specific order or sequence. It should be understood that the data used in such a way is interchangeable in proper cases, so that the embodiments of this application described herein can be implemented in other orders than the order illustrated or described herein. Moreover, the terms "include", "comprise" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

In order to ensure time synchronization, a current reference time is obtained through a GPS signal or a smart client. However, under some conditions, for example, there is no GPS signal or a GPS signal is weak, or when a UAV is not connected to a ground control terminal, the UAV cannot obtain a time from outside, resulting in a failure of synchronization of a system time of the UAV with the current reference time.

In order to synchronize the system time of the UAV with the current reference time, the embodiments of the present application provide a timing apparatus.

The timing apparatus is mounted in the UAV, and may include a timing unit and a power supply unit.

The timing unit is configured to generate the current reference time and to send the current reference time to at least one system in the UAV. The power supply unit is configured to supply power to the timing unit to ensure normal operation of the timing unit. It can be learned from the above that, the timing apparatus provided in the embodiments of the present application is disposed in the UAV, and generates the current reference time through the timing unit in the timing apparatus, and can independently provide the current reference time to the system in the UAV without a need of obtaining the current reference time by using a GPS signal or an external intelligent client, so that the system time of the UAV is synchronized with the current reference time, thereby improving task execution accuracy of the UAV.

The following describes the technical solutions of this application and how to resolve the foregoing technical issues according to the technical solution of this application in detail by using specific embodiments. The following specific embodiments may be mutually combined, and same or similar concepts or processes may not be repeatedly described in some embodiments. The following describes embodiments of this application with reference to the accompanying drawings.

FIG. 1 is a schematic structural diagram of a timing apparatus 10 according to an embodiment of the present application. The timing apparatus 10 may be mounted in an UAV. Exemplarily, referring to FIG. 1, the timing apparatus 10 may include:

a timing unit 101 configured to generate a current reference time and to send the current reference time to at least one system in the UAV; and a power supply unit 102 connected to the timing unit 101 and configured to supply power to the timing unit 101.

The current reference time means that in Newton's view of time and space, time is absolute and has nothing to do with any special reference system, and clocks statically placed in different inertial systems have the same timing result for the same motion process.

Exemplarily, at least one system may include one or two systems, or certainly, three systems. The number may be set according to actual needs. The specific number of the at least one system is not limited herein in the present applications. The at least one system in the UAV may include a flight control system, a vision system, a photographing system, etc. No limitation is imposed herein.

Optionally, the timing unit 101 is a low-power-consumption timing chip. Before the timing apparatus 10 is shipped from the factory, information such as a current reference time, etc. may be written into the low-power-consumption timing chip through specific software, so that the low-power-consumption timing chip can keep automatically updating a time with low power consumption, thereby generating a current reference time. Certainly, the embodiments of the present application are merely described by using an example that the timing unit 101 is a low-power-consumption timing chip, and it does not indicate that the embodiments of the present application are limited thereto.

Before generating the current reference time and sending the current reference time to the at least one system in the UAV, the timing unit 101 needs to be connected to the at least one system. When connecting to the at least one system, optionally, the timing unit 101 may include a communication interface so that the timing unit 101 can be connected to at least one system through the communication interface. Further, the communication interface may include any of a UART serial port, a single-wire interface and a bus interface.

It should be noted that, during implementation of the present application, the current reference time is generated by the timing unit 101, so as to achieve the following purpose. Since the current reference time is absolute and has nothing to do with any special reference system, the current reference time generated by the timing unit 101 can be used as the system time of the UAV, so that the UAV can perform flight tasks according to an absolute system, thereby improving accuracy of performing flight tasks by the UAV.

After the timing unit 101 generates the current reference time, the current reference time may be sent to at least one system in the UAV, so that the at least one system of the UAV can use the current reference time. In addition, it should be noted that, in order to ensure normal operation of the timing unit 101, a power supply unit 102 is disposed. The power supply unit 102 is configured to supply power to the timing unit 101, to ensure the normal operation of the timing unit 101, thereby preventing the timing unit 101 from failing to normally generate the current reference time as a result of an insufficient battery level. It can be learned from the above that, in the embodiments of the present application, the timing unit 101 is disposed in the UAV, and the current reference time is generated through the timing unit 101 in the timing apparatus 10, so that the current reference time can be independently provided to the system in the UAV without a need of obtaining the current reference time by using a GPS signal or an external intelligent client, thereby synchronizing the system time of the UAV with the current reference time.

The timing apparatus 10 provided in the embodiments of the present application is mounted in the UAV, and may include a timing unit 101 and a power supply unit 102. The timing unit 101 is configured to generate the current reference time and to send the current reference time to the at least one system in the UAV. The power supply 102 unit is configured to supply power to the timing unit 101 to ensure normal operation of the timing unit 101. It can be learned from the above that, the timing apparatus 10 provided in the embodiments of the present application is disposed in the UAV, and generates the current reference time through the timing unit 101 in the timing apparatus 10, and can independently provide the current reference time to the system in the UAV without a need of obtaining the current reference time by using a GPS signal or an external intelligent client, so that the system time of the UAV is synchronized with the current reference time.

In the embodiment shown in FIG. 1, in order to prevent the timing unit 101 from failing to normally generate the current reference time as a result of an insufficient battery level, the power supply unit 102 is disposed in the timing apparatus 10, to supply power to the timing unit 101 through the power supply unit 102.

Optionally, the power supply unit 102 may include a rechargeable battery. When the power supply unit 102 includes a rechargeable battery, correspondingly, the timing apparatus 10 may further include a power supply control unit 103, to determine, through the power supply control unit 103, whether to charge the rechargeable battery.

Figure 2:
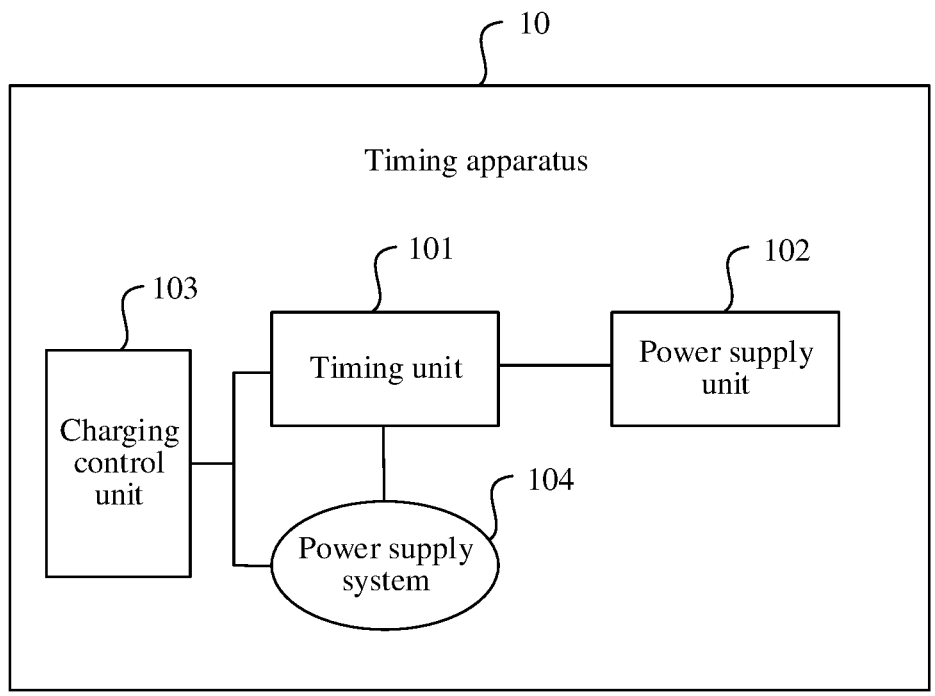
FIG. 2 is a schematic structural diagram of another timing apparatus according to an embodiment of the present application.

Exemplarily, referring to FIG. 2, FIG. 2 is a schematic structural diagram of another timing apparatus 10 according to an embodiment of the present application. The timing apparatus 10 may include:

a power supply control unit 103 connected to the power supply unit 102 and a power supply system 104 of the UAV respectively and configured to control the power supply system 104 of the UAV to charge the rechargeable battery.

Exemplarily, in the embodiments of the present application, the power supply control unit 103 is disposed to achieve the following purpose. The power supply control unit 103 may control the power supply system 104 of the UAV to charge the rechargeable battery, so as to supply sufficient power for the rechargeable battery.

It should be noted that in the embodiments of the present application, the power supply control unit 103 may determine whether to control the power supply system 104 of the UAV to charge the rechargeable battery in the following at least two possible manners.

In a possible implementation, the power supply control unit 103 determines whether a remaining battery level of the rechargeable battery is sufficient, and if it is determined that the remaining battery level of the rechargeable battery is insufficient, controls the power supply system 104 of the UAV to charge the rechargeable battery.

In this possible implementation, the power supply control unit 103 needs to determine whether the remaining battery level of the rechargeable battery is sufficient before controlling the power supply system 104 of the UAV to charge the rechargeable battery. If it is determined that the remaining battery level of the rechargeable battery meets a preset battery level requirement, the power supply system 104 of the UAV is controlled not to charge the rechargeable battery. If it is determined that the remaining battery level of the rechargeable battery does not meet the preset requirement, it indicates that a current remaining battery level of the rechargeable battery is insufficient. In this case, the power supply system 104 of the UAV is controlled to charge the rechargeable battery, so that the rechargeable battery has a sufficient battery level, thereby supplying power to the timing unit 101 through the rechargeable battery to ensure the normal operation of the timing unit 101.

Exemplarily, a preset battery level is set to 30%. The power supply control unit 103 needs to determine whether the remaining battery level of the rechargeable battery is sufficient before controlling the power supply system 104 of the UAV to charge the rechargeable battery. If the current remaining battery level of the rechargeable battery is greater than 30%, it indicates that the current remaining battery level of the rechargeable battery is sufficient. In this case, the power supply system 104 of the UAV is controlled not to charge the rechargeable battery. If it is determined that the remaining battery level of the rechargeable battery is less than 30%, it indicates that the current remaining battery level of the rechargeable battery is insufficient. In this case, the power supply system 104 of the UAV is controlled to charge the rechargeable battery, so that the rechargeable battery has a sufficient battery level, thereby providing power to the timing unit 101 through the rechargeable battery to ensure the normal operation of the timing unit 101.

In another possible implementation, the power supply control unit 103 may control, according to a remaining battery level of the rechargeable battery and an available battery level of the power supply system 104 of the UAV, the power supply system 104 of the UAV to charge the rechargeable battery or not.

In this possible implementation, the power supply control unit 103 needs to determine the remaining battery level of the rechargeable battery and the available battery level of the power supply system 104 of the UAV before controlling the power supply system 104 of the UAV to charge the rechargeable battery, so as to control, according to the remaining battery level of the rechargeable battery and the available battery level of the power supply system 104 of the UAV, the power supply system 104 of the UAV to charge the rechargeable battery or not.

Exemplarily, a preset battery level is set to 30%, and the available battery level of the power supply system 104 is preset to 30%. If the current remaining battery level of the rechargeable battery is less than 30%, and the available battery level of the power supply system 104 is less than 30%, it indicates that the current remaining battery level of the rechargeable battery is insufficient, and the battery level of the power supply system 104 is also insufficient. In this case, the power supply system 104 of the UAV is controlled not to charge the rechargeable battery, to prevent flight of the UAV from being affected as a result of an insufficient battery level of the power supply system 104 of the UAV. If the current remaining battery level of the rechargeable battery is less than 30%, and the available battery level of the power supply system 104 is greater than 30%, it indicates that the current remaining battery level of the rechargeable battery is insufficient, and the battery level of the power supply system 104 is sufficient. In this case, the power supply system 104 of the UAV is controlled to charge the rechargeable battery, so that the rechargeable battery has a sufficient battery level, thereby supplying power to the timing unit 101 through the rechargeable battery to ensure the normal operation of the timing unit 101.

Exemplarily, the power supply control unit 103 in the embodiments of the present application may be implemented by a controller, a processor, an application specific integrated circuit (ASIC), or a field-programmable gate array (FPGA), etc. No limitation is imposed herein.

Figure 3:
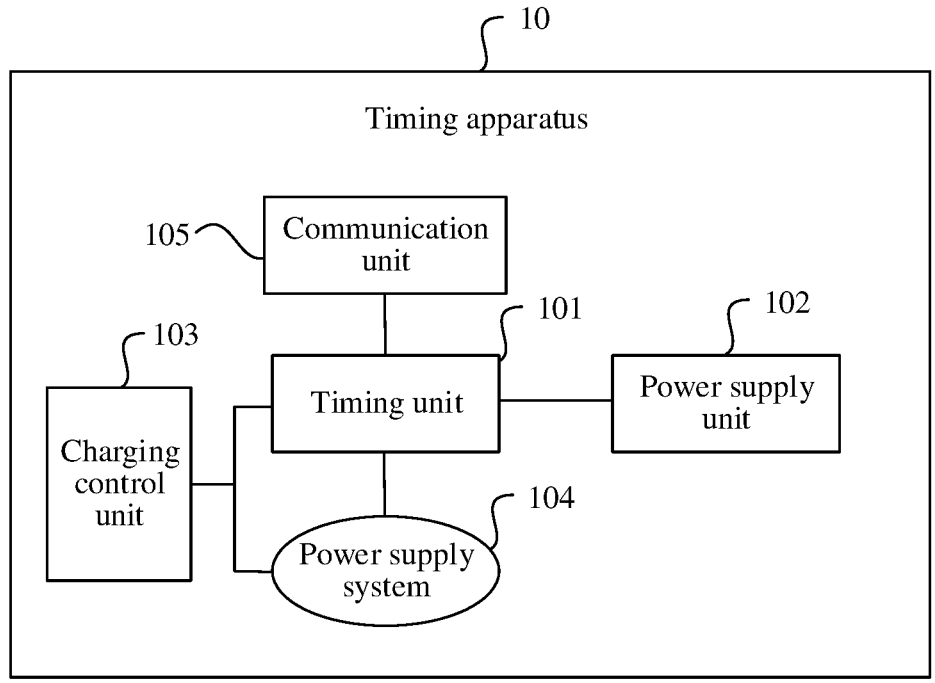
FIG. 3 is a schematic structural diagram of still another timing apparatus according to an embodiment of the present application.

Based on the embodiment shown in FIG. 1 or FIG. 2, when there is an error between the current reference time generated by the timing unit 101 and the external reference time, in order to update the current reference time generated by the timing unit 101 so that the current reference time generated by the timing unit 101 is synchronized with the external reference time, optionally, the timing apparatus 10 may further include a communication unit 105. Referring to FIG. 3, FIG. 3 is a schematic structural diagram of still another timing apparatus 10 according to an embodiment of the present application. The timing apparatus 10 may further include:

a communication unit 105 configured to communicate with an external device to obtain an external reference time recorded by the external device, and to send the external reference time to the timing unit 101.

The timing unit 101 is further configured to receive a current reference time sent by the communication unit 105, and to update the generated current reference time to the external reference time.

Exemplarily, the communication unit 105 is disposed to achieve the following purpose. The external reference time recorded by the external device may be obtained through the communication unit 105, and is sent to the timing unit 101 to update the current reference time generated by the timing unit 101 to the external reference time, thereby improving accuracy of the current reference time in the timing unit 101, and ensuring synchronization of the current reference time generated by the timing unit 101 with the external reference time.

It should be noted that in the embodiments of the present application, the communication unit 105 may be implemented by an apparatus such as a wireless transceiver, etc. The communication unit may obtain, through a wireless connection, the external reference time recorded by the external device. The external device may be an intelligent terminal device with a wireless connection function, such as a mobile phone or a tablet computer, etc. Alternatively, the communication unit 105 may be implemented by a GPS chip, which may determine the external reference time by using an obtained GPS signal.

Figure 4:
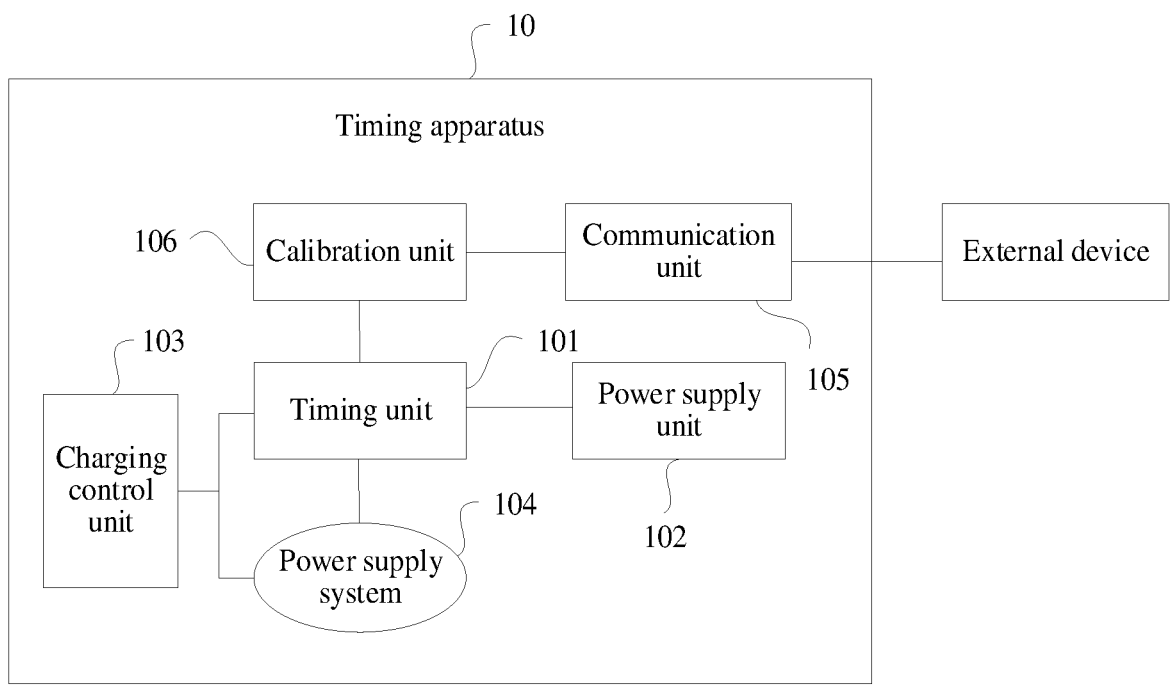
FIG. 4 is a schematic structural diagram of yet another timing apparatus according to an embodiment of the present application.

After obtaining the external reference time, the communication unit 105 may first send the external reference time to a calibration unit 106, and determine, through the calibration unit 106, whether to calibrate the current reference time generated by the timing unit 101. Exemplarily, referring to FIG. 4, FIG. 4 is a schematic structural diagram of yet another timing apparatus 10 according to an embodiment of the present application. The timing apparatus 10 may further include:

a calibration unit 106 configured to: receive the external reference time sent by the communication unit 105, determine, according to the external reference time, whether the current reference time generated by the timing unit 101 needs to be calibrated, and if a determining result is yes, send the external reference time to the timing unit 101.

Exemplarily, in the embodiments of the present application, the calibration unit 106 is disposed to achieve the following purpose. The calibration unit 106 may first receive the external reference time sent by the communication unit 105, and further determine whether to calibrate the current reference time generated by the timing unit 101, thereby improving the accuracy of the current reference time in the timing unit 101, and ensuring synchronization of the current reference time generated by the timing unit 101 with the external reference time.

During determining whether to calibrate the current reference time generated by the timing unit 101, if the current reference time generated by the timing unit 101 is the same as the external reference time, it indicates that the current reference time generated by the timing unit 101 is accurate. In this case, the external reference time is not sent to the timing unit 101. If the current reference time generated by the timing unit 101 is different from the external reference time, it indicates that the current reference time generated by the timing unit 101 is inaccurate. In this case, the external reference time is sent to the timing unit 101 to update the current reference time generated by the timing unit 101, thereby improving the accuracy of the current reference time in the timing unit 101, and ensuring synchronization of the current reference time generated by the timing unit 101 with the external reference time.

Exemplarily, the calibration unit 106 in the timing apparatus 10 may periodically control the communication unit 105 to be turned on to detect whether an external reference time can be obtained. Not only it is ensured that the current reference time generated by the timing unit 101 can be calibrated, but also the power consumption of the timing apparatus 10 is reduced.

Exemplarily, the calibration unit 106 in the embodiments of the present application may be implemented by a controller, a processor, an application specific integrated circuit (ASIC), or a field-programmable gate array (FPGA), etc. No limitation is imposed herein.

Figure 5:
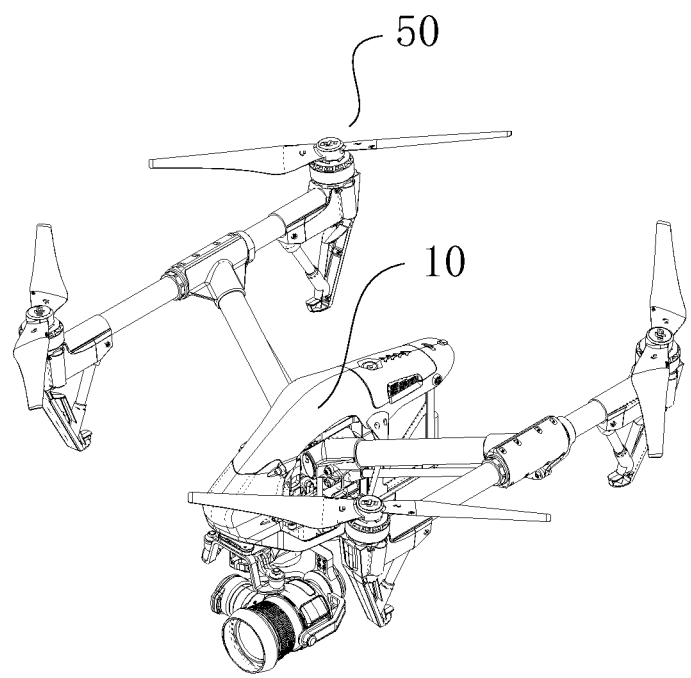
FIG. 5 is a schematic structural diagram of a UAV according to an embodiment of the present application.

FIG. 5 is a schematic structural diagram of a UAV 50 according to an embodiment of the present application. Referring to FIG. 5, the UAV 50 may include:

the timing apparatus 40 according to any of the above embodiments.

A timing unit is configured to generate a current reference time and to send the current reference time to at least one system in the UAV.

A power supply unit is connected to the timing unit and is configured to supply power to the timing unit.

It can be learned from the above that, the UAV provided in the embodiments of the present application generates the current reference time through the timing unit in the timing apparatus disposed in the UAV, and provides the current reference time to the system in the UAV without a need of obtaining the current reference time by using a GPS signal or an external intelligent client, so that the system time of the UAV is synchronized with the current reference time.

Optionally, the power supply unit includes a rechargeable battery.

Optionally, the timing apparatus 40 may further include:
a charging control unit connected to the power supply unit and a power supply system of the UAV respectively and configured to control the power supply system of the UAV to charge the rechargeable battery.

Optionally, the charging control unit is further configured to: determine whether a remaining battery level of the rechargeable battery is sufficient, and if it is determined that the remaining battery level of the rechargeable battery is insufficient, control the power supply system of the UAV to charge the rechargeable battery.

Optionally, the charging control unit is further configured to control, according to a remaining battery level of the rechargeable battery and an available battery level of the power supply system of the UAV, the power supply system of the UAV to charge the rechargeable battery or not.

Optionally, the timing apparatus 40 may further include:
a communication unit configured to communicate with an external device to obtain an external reference time recorded by the external device, and to send the external reference time to the timing unit.

The timing unit is further configured to receive a current reference time sent by the communication unit, and to update the generated current reference time to the external reference time.

Optionally, the timing apparatus 40 may further include:
a calibration unit configured to: receive the external reference time sent by the communication unit, determine, according to the external reference time, whether the current reference time generated by the timing unit needs to be calibrated, and if a determining result is yes, send the external reference time to the timing unit.

Optionally, the timing unit includes a communication interface.

The communication interface is configured to be connected to the at least one system.

Optionally, the communication interface may include any of a UART serial port, a single-wire interface and a bus interface.

Optionally, the timing unit is a low-power-consumption timing chip.

The UAV 40 in the embodiments of the present application may perform the technical solutions of the timing apparatus in any of the above embodiments, and implementation principles and beneficial effects thereof are similar. Details are not described herein again.

A person skilled in the art can easily figure out other implementation solutions of the present disclosure after considering the specification and practicing this application that is disclosed herein. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are indicated by the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A timing apparatus, wherein the timing apparatus is mounted in an unmanned aerial vehicle (UAV) and comprises:
a timing unit configured to generate a current reference time and to send the current reference time to at least one system in the UAV; and
a power supply unit connected to the timing unit and configured to supply power to the timing unit;
wherein the power supply unit comprises a reel battery;
a charging control unit connected to the power supply unit and a power supply system of the UAV respectively and configured to control the power supply system of the UAV to charge the rechargeable battery;
wherein the charging control unit is further configured to control, according to a remaining battery level of the rechargeable battery and an available battery level of the power supply system of the UAV, the power supply system of the UAV to charge the rechargeable battery or not.

2. The timing apparatus according to claim 1, wherein the charging control unit is further configured to: determine whether a remaining battery level of the rechargeable battery is sufficient, and when the remaining battery level of the rechargeable battery is insufficient, control the power supply system of the UAV to charge the rechargeable battery.

3. The timing apparatus according to claim 1, further comprising:
a communication unit configured to communicate with an external device to obtain an external reference time recorded by the external device, and to send the external reference time to the timing unit, wherein
the timing unit is further configured to receive a current reference time sent by the communication unit, and to update the generated current reference time to the external reference time.

4. The timing apparatus according to claim 3, further comprising:
a calibration unit configured to: receive the external reference time sent by the communication unit, determine, according to the external reference time, whether the current reference time generated by the timing unit needs to be calibrated, and when a determining result is yes, send the external reference time to the timing unit.

5. The timing apparatus according to claim 1, wherein the timing unit comprises a communication interface, wherein the communication interface is configured to be connected to the at least one system.

6. The timing apparatus according to claim 5, wherein the communication interface comprises any of a UART serial port, a single-wire interface and a bus interface.

7. The timing apparatus according to claim 1, wherein the timing unit is a low-power-consumption timing chip.

8. The timing apparatus according to claim 1, wherein the charging control unit is at least one of a controller, a processor, an application specific integrated circuit (ASIC), and a field-programmable gate array (FPGA).

9. The timing apparatus according to claim 4, wherein the calibration unit is at least one of a controller, a processor, an application specific integrated circuit (ASIC), and a field-programmable gate array (FPGA).

10. The timing apparatus according to claim 2, wherein the charging control unit is further configured to: when the remaining battery level of the rechargeable battery meets a preset battery level requirement, control the power supply system of the UAV not to charge the rechargeable battery.

11. The timing apparatus according to claim 10, wherein the power supply control unit is further configured to: determine whether the remaining battery level of the rechargeable battery is sufficient before controlling the power supply system of the UAV to charge the rechargeable battery; when the current remaining battery level of the rechargeable battery is greater than a preset battery level, control the power supply system of the UAV not to charge the rechargeable battery.

12. The timing apparatus according to claim 11, wherein when the current remaining battery level of the rechargeable battery is less than the preset battery level, control the power supply system of the UAV to charge the rechargeable battery.

13. The timing apparatus according to claim 1, wherein the power supply control unit is further configured to: when the current remaining battery level of the rechargeable battery is less than a preset battery level, and the available battery level of the power-supply system is less than the preset battery level, control the power supply system of the UAV not to charge the rechargeable battery.

14. The timing apparatus according to claim 1, wherein the power supply control unit is further configured to: when the current remaining battery level of the rechargeable battery is less than a preset battery level, and the available battery level of the power supply system is greater than the preset battery level, control the power supply system of the UAV to charge the rechargeable battery.

15. The timing apparatus according to claim 11, the preset battery level is 30%.

16. The timing apparatus according to claim 3, wherein the communication unit is a CEPS chip.

17. The timing apparatus according to claim 3, wherein the communication unit is a wireless transceiver, the communication unit is further configured to: obtain, through a wireless connection, the external reference time recorded by the external device.

\* \* \* \* \*